United States Patent
McMillan et al.

(10) Patent No.: US 6,979,965 B2
(45) Date of Patent: Dec. 27, 2005

(54) SPRING RETURN ACTUATOR FOR A DAMPER

(75) Inventors: Scott D. McMillan, Golden Valley, MN (US); Greg T. Mrozek, New Hope, MN (US); Christopher M. Lange, New Hope, MN (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 10/422,877

(22) Filed: Apr. 24, 2003

(65) Prior Publication Data

US 2004/0212336 A1 Oct. 28, 2004

(51) Int. Cl.[7] .......................... H02K 7/10; F16K 31/02
(52) U.S. Cl. ...................... 318/160; 318/159; 318/376; 137/1; 137/129.01; 137/129.11; 307/64; 307/66
(58) Field of Search ............ 307/64, 66; 318/160–169, 318/448, 286, 650, 376, 471, 430; 98/115 SB; 251/129.03, 174, 171, 129.11; 137/1

(56) References Cited

U.S. PATENT DOCUMENTS

| | | | |
|---|---|---|---|
| 3,974,427 A | * | 8/1976 | Carson ....................... 236/1 C |
| 4,177,716 A | * | 12/1979 | Bowe et al. ................... 454/50 |
| 4,205,783 A | * | 6/1980 | Dietsche et al. ............ 236/1 G |
| 4,417,288 A | | 11/1983 | Hattori et al. |
| 4,423,364 A | | 12/1983 | Kompelien et al. |
| 4,439,139 A | | 3/1984 | Nelson et al. |
| 4,556,169 A | * | 12/1985 | Zervos ....................... 236/49.4 |
| 4,572,333 A | | 2/1986 | Westley |
| 4,613,798 A | * | 9/1986 | Baumann .................... 318/160 |
| 4,677,355 A | * | 6/1987 | Baumann .................... 318/160 |
| 4,771,643 A | | 9/1988 | Mott |

(Continued)

FOREIGN PATENT DOCUMENTS

| | | |
|---|---|---|
| EP | 0847132 A2 | 6/1998 |
| JP | 2003-322395 | * 11/2003 |
| WO | WO 01/90621 A1 | 11/2001 |

OTHER PUBLICATIONS

Belimo Model AF24–SR US, AFR24–SR US product information sheets, pp. 14–15, D20230 / 5 4 3 2 1 –05/ 02–10M–EG–Subject to change. © Belimo Aircontrols (USA), Inc., May 2002.

(Continued)

*Primary Examiner*—Paul Ip
(74) *Attorney, Agent, or Firm*—Gregory M. Ansems

(57) ABSTRACT

An actuator including an electric motor driven by a drive circuit powered by a power source, and a load coupled to the electric motor. The actuator further includes a spring biasing the load to a first position, and a microcontroller coupled to the electric motor to commutate the electric motor. Upon failure of the power source, the spring returns the damper to the first position, and, as the spring returns the load to the first position, the electric motor is spun to generate electricity that is used to power the microcontroller. The microcontroller can govern a speed at which the spring returns the load to the first position. In addition, a potentiometer can be used to indicate when the load approaches the first position so that the microcontroller can slow the speed of return prior to the load reaching the first position.

24 Claims, 2 Drawing Sheets

U.S. PATENT DOCUMENTS

| | | | | |
|---|---|---|---|---|
| 5,081,405 A | * | 1/1992 | Nelson | 318/448 |
| 5,096,156 A | * | 3/1992 | Wylie et al. | 251/77 |
| 5,100,101 A | * | 3/1992 | Shah | 251/129.11 |
| 5,131,623 A | * | 7/1992 | Giordani | 251/129.03 |
| 5,182,498 A | * | 1/1993 | Stuhr | 318/15 |
| 5,278,454 A | * | 1/1994 | Strauss et al. | 307/64 |
| 5,328,150 A | * | 7/1994 | Guativa | 251/129.1 |
| 5,363,025 A | | 11/1994 | Colling | |
| 5,519,295 A | | 5/1996 | Jatnieks | |
| 5,540,414 A | * | 7/1996 | Giordani et al. | 251/174 |
| 5,550,449 A | * | 8/1996 | Ege et al. | 318/632 |
| 5,635,809 A | * | 6/1997 | Ganser et al. | 318/650 |
| 5,723,918 A | | 3/1998 | Schilling et al. | |
| 5,872,434 A | * | 2/1999 | Hill | 318/159 |
| 5,986,369 A | | 11/1999 | Hanley et al. | |
| 6,051,948 A | | 4/2000 | Vepy | |
| 6,058,726 A | * | 5/2000 | Noritake | 62/186 |
| 6,100,655 A | * | 8/2000 | McIntosh | 318/159 |
| 6,184,604 B1 | * | 2/2001 | Takano et al. | 310/77 |
| 6,244,564 B1 | * | 6/2001 | Noritake | 251/129.11 |
| 6,249,100 B1 | * | 6/2001 | Lange | 318/471 |
| 6,250,323 B1 | * | 6/2001 | Genga et al. | 137/1 |
| 6,369,540 B1 | | 4/2002 | Lange et al. | |
| 6,373,207 B1 | | 4/2002 | Yablonovitch | |
| 6,495,981 B2 | * | 12/2002 | Romanowich et al. | 318/434 |
| 2002/0109473 A1 | * | 8/2002 | Romanowich et al. | 318/434 |
| 2004/0084542 A1 | * | 5/2004 | DeYoe et al. | 236/49.3 |

OTHER PUBLICATIONS

Kele Solutions product information sheets for *Siemens Spring Return Direct Coupled Actuators*, GMA, GCA Series; 2 pages; http://www.kele.com, Dec. 2001.

Pacific Liquid & Air Systems, Pumps—Motors—Controls, Article: *The Three Phase Induction Motor*, Author: Joe Evans, Ph.D., 6 pages; http://www.pacificliquid.com, no date.

e–insite internet article; *Circuit Forms DC–Motor Switch with Brake*, edited by Bill Travis, authored by JB Guiot, DCS AG, Allschwil, Switzerland—EDN, Jan. 10, 2002, 2 pages; viewed Mar. 13, 2003 at e–insite website: http://www.e–insite.net/ednmag/index.asp?layout=article&articleid=CA 189474.

Industrial Technology website: http://www.industrialtechnology.co.uk/1998/oct/siemens.html; viewed Mar. 13, 2003: *Electric Braking Techniques*, 2 pages, Oct. 1998.

Embedded.com website: http://www.embedded.com/2000/0008/0008spectra.htm; EmbeddedSystems Programming article: *Spectra Motor Rotation Control*, author: Don Morgan, viewed Feb. 29, 2003, 5 pages.

Copy of U.S. Appl. No. 10/423,029, filed Apr. 24, 2003, entitled: Current Control Loop for Actuator and Method.

* cited by examiner

SPRING RETURN ACTUATOR FOR A DAMPER

TECHNICAL FIELD

The present invention generally relates to actuators. In addition, the present invention relates to actuators including a microcontroller to govern a return speed of a spring return.

BACKGROUND

Actuators are commonly used in a variety of contexts to control devices. For example, actuators are used in heating, ventilating, and air-conditioning (HVAC) systems to open and close dampers to regulate airflow through ventilation ducts.

A typical actuator includes a spring return to drive a damper coupled to the actuator back to an initial or closed position. The spring return includes a spring that is wound by the actuator's motor as the actuator opens the damper. The energy stored in this spring is used to return the damper to the initial position upon loss of power.

Under less than peak load conditions, the spring of the actuator can cause the actuator to accelerate to high speeds as the damper is returned to the initial position. This is often undesirable because excessive speed can cause damage to the actuator or controlled device. For this reason, some means of controlling the return speed is desirable.

Prior actuator designs to control the acceleration of the actuator caused by the spring return during power failure have added some combination of electrical and mechanical components to the actuator to limit the maximum spring return speed. See, for example, U.S. Pat. Nos. 4,572,333, 4,771,643, 5,182,498, 6,249,100, and 6,369,540.

For example, in U.S. Pat. Nos. 6,249,100 and 6,369,540, a zener diode is placed in series with a conventional diode to regulate the voltage induced across the windings of the motor and to thereby enhance a braking effect provided by the motor in its unenergized state when the motor is rotating in reverse under the force of the spring return.

In another example disclosed in U.S. Pat. No. 4,572,333, a pinion assembly of the actuator includes shoes that move outwardly as the motor increases in rotational speed and frictionally engage an internal drum surface to govern return speed.

However, these designs add cost and only provide for a limit on maximum speed of return. The designs do not allow the actuator return speed to be further reduced when nearing the initial or closed position (i.e. the end stop) to reduce gear train loads when the actuator reaches the end stop. Therefore, other implementations often employ a one-way clutch mechanism to decouple the spinning motor's inertia from the gear train when the motor reaches the end stop. However, these clutch mechanisms also add expense and are an additional wear item in the gear train.

Therefore, it is desirable to provide new systems and methods for regulating a speed of return of a spring return actuator upon power failure.

SUMMARY

The present invention generally relates to actuators. In addition, the present invention relates to actuators including a microcontroller to govern a return speed of a spring return.

In one aspect, the invention relates to an actuator including an electric motor driven by a drive circuit powered by a power source, and a load coupled to the electric motor. The actuator further includes a spring biasing the load to a first position, and a microcontroller coupled to the electric motor to commutate the electric motor. Upon failure of the power source, the spring returns the damper to the first position, and, as the spring returns the load to the first position, the electric motor is spun to generate electricity that is used to power the microcontroller.

In another aspect, the microcontroller of the actuator can govern a speed at which the spring returns the load to the first position.

In yet another aspect, the actuator can include a potentiometer that can be used to indicate when the load approaches the first position so that the microcontroller can slow the speed of return prior to the load reaching the first position.

The above summary of the present invention is not intended to describe each disclosed embodiment or every implementation of the present invention. Figures in the detailed description that follow more particularly exemplify embodiments of the invention. While certain embodiments will be illustrated and described, the invention is not limited to use in such embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example and the drawings, and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention generally relates to actuators. In addition, the present invention relates to actuators including a microcontroller to govern a return speed of a spring return. While the invention is not so limited, a greater understanding will be achieved through review of the following specification and attached drawings.

Generally, one embodiment illustrated herein includes a spring return actuator. The example spring return actuator includes an electric motor driven by a drive circuit powered by a power source. The example actuator also includes a spring. The spring or other structure for storing potential energy biases a load coupled to the electric motor to a first position. The example actuator also includes a microcontroller coupled to the drive circuit and the electric motor to commutate the electric motor.

When power from the power source to the actuator fails, the spring returns the load to the first position. As the spring returns the load to the first position, the electric motor is spun to generate electricity that is used to power the microcontroller. As the microcontroller is powered by the electricity generated by the electric motor, the microcontroller can be used to perform various functions such as, for example, governing a rate at which the load is brought back to the first position by the spring return.

Figure 1:
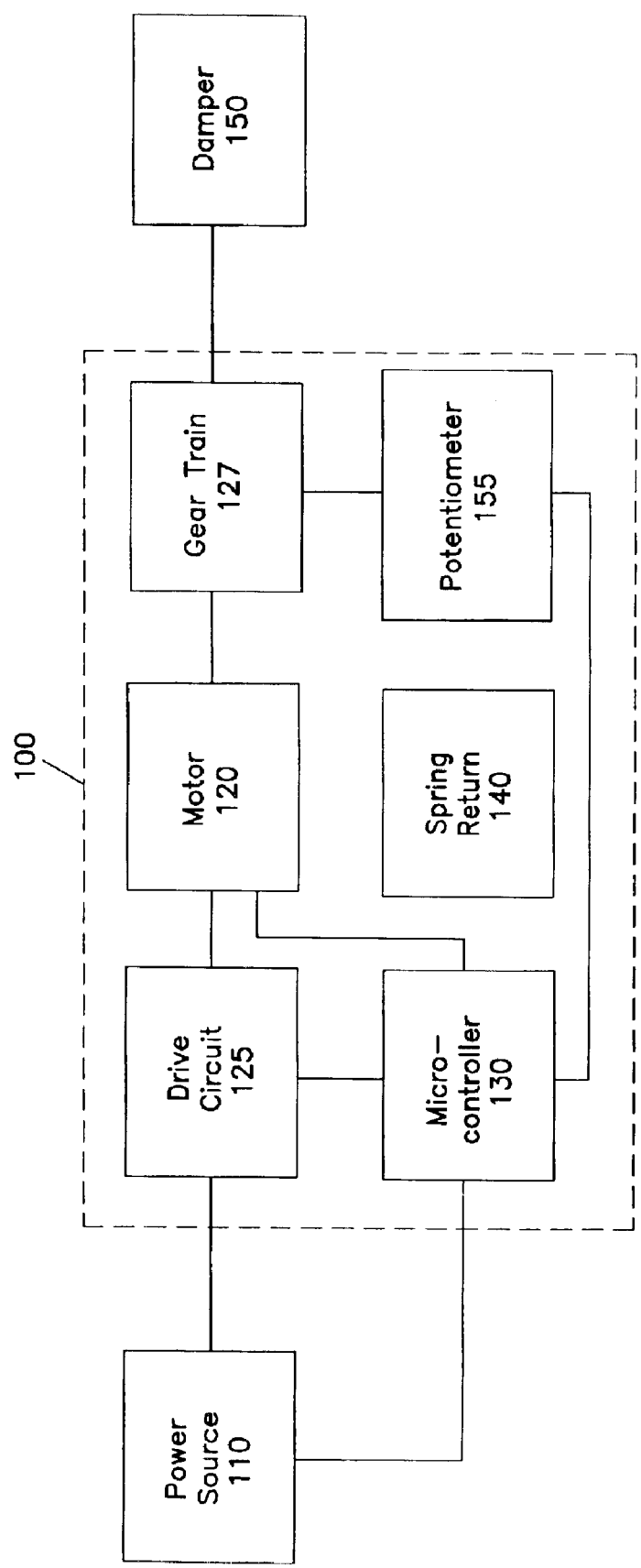
FIG. 1 is a block diagram illustrating an example system including an embodiment of an actuator coupled to a power source and damper made in accordance with the present invention.
Figure 2:
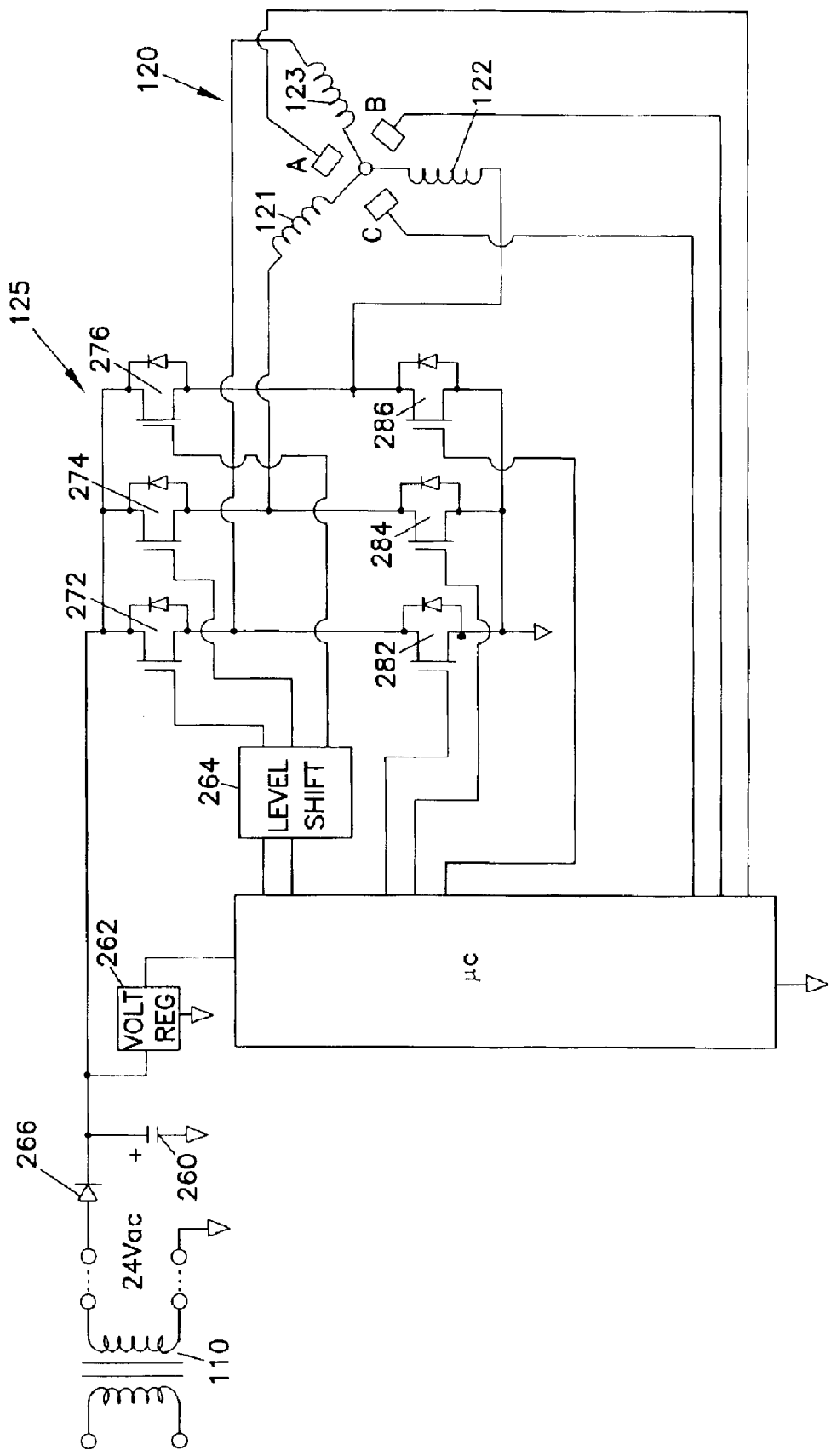
FIG. 2 is a schematic diagram of components of an example actuator made in accordance with the present invention.

Referring now to FIGS. 1 and 2, one embodiment of an actuator 100 is illustrated in an example working environment. The actuator 100 generally includes a motor 120, a drive circuit 125, a gear train 127, a microcontroller 130, and a spring return 140. The actuator 100 can also alternatively include a potentiometer 155.

Also shown in FIG. 1 is a power source 110, which is preferably 24 volts alternating current, although other voltages can also be used depending on the requirements of the actuator. In the illustrated embodiment, the power source 110 is powered by a standard 110-volt alternating current electric source that is converted to 24 volts alternating current, which is then supplied to power the actuator 100. A diode (see, e.g., diode 266 in FIG. 2) functions as a rectifier for converting the current supplied to the actuator from alternating current to direct current.

In addition, a damper 150 is shown. In the illustrated embodiment, the damper 150 is part of a heating, ventilating, and air-conditioning (HVAC) system, such as an HVAC system in a building or house. The damper 150 is used to control airflow through one or more ventilation ducts. The damper 150 accomplishes this by moving a series of damper blades between a first or closed position and a second or open position. In addition, the damper 150 can be held in an intermediate position between the first and second positions.

The damper 150 is opened and closed by the actuator 100. The example actuator 100 and methods of its use are described further below.

I. Motor, Drive Circuit, Gear Train, and Potentiometer

The motor 120 is preferably a brushless electric motor. In the illustrated embodiment, the motor 120 is a three-coil, brushless direct current motor including coils 121, 122, and 123 (see FIG. 2). In other embodiments, any direct current motor with permanent magnets can be used.

In a typical brushless electric motor, permanent magnets are rotatably journaled in a rotor that spins. A fixed stator is positioned about the rotor, the stator including the coils. Current flowing through the coils is switched (referred to as commutation) to alternately charge the coils with alternating polarity, thereby causing the rotor, with the attracted permanent magnets, to spin.

The drive circuit 125 is coupled to the motor 120 and alternates the current flowing through the coils. Specifically, the drive circuit 125 includes high-side switches 272, 274, and 276, as well as low-side switches 282, 284, and 286. By alternating the state of each of these switches (i.e. on or off), current flowing through the coils 121, 122, and 123 is switched. In the illustrated embodiment, the high-side switches 272, 274, and 276 are p-channel MOSFETs, and the low-side switches 282, 284, and 286 are n-channel MOSFETs, although other switching devices can also be used.

The microcontroller 130 preferably controls the state of each of the switches. For example, the microcontroller 130 can turn on high-side switch 272 and low-side switch 284 while turning off low-side switch 282 and high-side switch 274, thereby causing current to flow in a first direction through the coils 121 and 123 of the motor 120. The microcontroller 130 can then turn off high-side switch 272 and low-side switch 284 while turning on low-side switch 282 and high-side switch 274, thereby causing current to flow in a second, opposite direction through the coils 121 and 123.

The level shift 264 is configured to convert an output of the microcontroller 130, typically approximately 5-volts, to a higher voltage needed to switch on the high-side p-channel MOSFETs 272, 274, and 276.

The motor 120 preferably includes three Hall sensors A, B, and C. Each Hall sensor is positioned adjacent the permanent magnets of the rotor and can measure the change in polarity as alternately-charged magnets pass near the sensor. These state changes measured by the Hall sensors A, B, and C are communicated to the microcontroller 130, which uses this information to commutate the motor 120.

Output of the motor 120 is coupled to the gear train 127. The gear train 127 includes a series of gears that reduce the speed at which an actuator shaft coupled from the gear train 127 to the damper 150 spins. In a preferred embodiment, the ratio between the output of the motor 120 and the output of the gear train 127 is approximately 6900:1. It should be understood that other ratios can also be used, and that the gear train 127 can be eliminated if a 1:1 ratio is desired.

Output of the gear train 127 is coupled to the damper 150. As noted above, in the illustrated embodiment the damper 150 is a part of an HVAC system and is used to control airflow through one or more ventilation ducts. Preferably, the motor 120 drives damper 150 between a first or closed position and a second or open position. In addition, the damper 150 can be maintained at an intermediate position between the first position and the second position.

Preferably, in the illustrated embodiment, the motor 120 drives the gear train 127 at approximately 1200 RPM to close the damper 150. In alternative embodiments, the spring return 140 (described further below), rather than the motor of the actuator, is used to close the damper 150. It preferably takes the actuator 100 approximately 90 seconds to drive the damper 150 from a fully open position to a fully closed position.

A potentiometer 155 can alternatively be coupled to the gear train 127 to measure a position of the gear train relative to the open or closed state of the damper 150. See FIG. 1. For example, the potentiometer 155 can be used to measure how close the damper 150 is to the closed position, as described further below.

II. Microcontroller

The microcontroller 130 is coupled to the drive circuit 125 and Hall sensors A, B, and C of the motor 120 to commutate the motor, as described above. In addition, the microcontroller 130 is used to monitor and regulate the closing of the damper 150 during power failure, as described further below.

In addition, the microcontroller performs other functions as well. For example, if the microcontroller employs serial communications, the microcontroller can communicate with other control devices such as a building controller.

In a preferred embodiment, the microcontroller is a microcontroller manufactured by NEC Electronics with product number UPD78F9177GB. However, controllers from other manufacturers such as Motorola, Atmel, and Microchip can also be used.

III. Spring Return

In the illustrated embodiment, the spring return 140 includes a spring that provides biasing in a given direction. See, for example, U.S. Pat. Nos. 4,572,333, 5,182,498, and 6,249,100, all of which are incorporated herein by reference in their entireties, that describe spring returns used to drive an actuator in a desired direction.

The spring return 140 is coupled to the motor 120 and functions, through the motor, to bias the damper 150 to the closed position. For example, if the damper 150 is in the open or intermediate position and power to the motor is cut, the spring return 140 drives the motor 120 in a reverse direction to close the damper 150.

IV. Methods of Use

During normal operation, the example actuator 100 functions as follows. When the damper 150 is in the closed position and the HVAC system requires that the damper be opened, the microcontroller 130 uses power from the power source 110 to commutate the motor 120. The motor 120 drives the gear train 127, which causes the damper 150 to open to the intermediate or fully open position. As the motor 120 causes the damper 150 to open, the spring return 140 stores potential energy generated during the opening of the damper.

In the illustrated embodiment, when it is desirable to close the damper 150 during normal operation, the motor 120 is commutated in an opposite direction to move the damper from the open or intermediate position to the closed position. As noted above, in alternative embodiments, the spring return 140 can be utilized instead of reversing the drive of the motor 120 to return the damper 150 to the closed position during normal operation.

If the power source 110 fails while the damper 150 is in the open or intermediate position, it may be desirable to move the damper 150 to the closed position. As described above, the potential energy stored in the spring return 140 can be used to drive the motor 120 in a reverse direction to move the damper 150 to the closed position during a power failure.

As the spring return 140 drives the motor 120 in reverse, electrical current is generated because the permanent magnets of the rotor of the motor are caused to pass by the coils of the motor. Diodes included as part of the MOSFET switches 272, 274, 276, 282, 284, and 286 act as rectifiers, and the rectified current is used to charge a capacitor 260 (see FIG. 2).

The charge in the capacitor 260 is used to power the microcontroller 130. In this manner, the potential energy of the spring return 140 can be converted to electric energy through the motor 120 to power the microcontroller 130 during failure of the power source 110. The capacitor 260 can be charged sufficiently with the motor 120 being driven at less than 1000 RPM by the spring return 140.

In one embodiment, the microcontroller 130, while being powered by the capacitor 260 in the manner described above during failure of the power source 110, can be used to govern the speed at which the spring return 140 returns the damper 150 to the closed position. For example, the microcontroller 130 can monitor the speed at which the damper 150 is being closed by monitoring the state changes measured by the Hall sensors A, B, and C of the motor 120. Based on how fast the state changes are occurring, the microcontroller 130 can determine a rate at which the damper 150 is being closed.

The microcontroller 130 can also be used to govern the speed at which the damper 150 is closed. For example, if the microcontroller 130 determines by monitoring the state changes measured by the Hall sensors A, B, and C that the damper 150 is being closed too rapidly, the microcontroller 130 can slow the closing of the damper 150 by slowing the motor 120. In one embodiment, the microcontroller 130 slows the motor 120 by "short-circuiting" the motor windings when the speed is exceeded. For example, this short circuit can be accomplished by turning on switches 282 and 284 at the same time, or preferably by turning on all three switches 282, 284, and 286 at the same time. This causes the energy generated by rotation of the motor 120 by the spring return 140 to be dissipated in the motor winding, thus slowing its rotation. When below the desired speed, the microcontroller 130 can open the short circuit. In this manner, the switches used for commutation of the motor are also used to brake the motor during spring return.

In a preferred embodiment, the microcontroller 130 governs the spring return 140 so that the speed at which the motor is spinning does not exceed approximately 5500 RPM, and it therefore takes approximately 20 seconds for the damper 150 to go from a fully open position to a closed position.

It may be advantageous to monitor and regulate the speed at which the damper 150 is closed during failure of the power source 110 in this manner for several reasons. For example, the gear train 127 and/or damper 150 can be damaged if driven too fast by the spring return 140. Therefore, the microcontroller 130 can govern the speed at which the gear train 127 is driven to minimize chances of damage to the gear train 127 and damper 150.

In addition, the gear train 127 can be damaged if the damper 150 reaches a closed position, or end stop, at too great a rotational speed. Therefore, by using position or end stop information (i.e. how close the damper 150 is to the closed position) provided by the potentiometer 155 connected to the gear train 127, the microcontroller 130 can also slow the motor to a lower speed as the damper 150 approaches the end stop. This can reduce the impact load to the gear train 127 caused by the spinning motor's inertia when the end stop is reached. Advantageously, this can result in elimination of the one-way clutch used in other actuators.

In a preferred embodiment, the speed of the motor is reduced to approximately 1200 RPM as the damper 150 approaches the end stop.

Although the microcontroller 130 is preferably used to govern the speed of return of the damper 150 during power failure, the microcontroller 130 can also perform other functions as it is powered by the potential from the capacitor 260. For example, if the microcontroller 130 employs a form of serial communications, the microcontroller 130 can utilize power from the capacitor 260 to signal a control device or building controller that power has been lost.

Although the example actuators shown herein are described in conjunction with the control of dampers of an HVAC system, the actuators can be used in a variety of other contexts to control various other devices. For example, the actuator shaft of the actuator 100 can be coupled to valve to open and close the valve as desired.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An actuator, comprising:
   an electric motor driven by a drive circuit powered by a power source;
   a load coupled to the electric motor;
   a structure biasing the load to a first position; and
   a microcontroller coupled to the electric motor to commutate the electric motor;
   wherein the structure returns the load to the first position, and wherein, as the structure returns the load to the first position, the electric motor is spun to generate electricity that powers the microcontroller.

2. The actuator of claim 1, wherein the load is a damper.

3. The actuator of claim 1, wherein the microcontroller governs a speed at which the structure returns the load to the first position.

4. The actuator of claim 3, further comprising a potentiometer to indicate when the load approaches the first position.

5. The actuator of claim 1, wherein the structure returns the load to the first position upon failure of the power source.

6. A spring return actuator for a damper, comprising:
   an electric motor driven by a bridge circuit powered by a power source;
   at least one sensor positioned to sense rotation of a rotor of the electric motor;
   a gear train coupled to a shaft of the electric motor;
   a damper coupled to the gear train of the electric motor by an actuator shaft, the damper moving between an open position and a closed position;
   a spring biasing the damper to the closed position; and
   a microcontroller coupled to the electric motor to commutate the electric motor;
   wherein, upon failure of the power source with the damper in the open position, the spring returns the damper to the closed position, and wherein, as the spring returns the damper to the closed position, the electric motor is spun to generate electricity that is used to power the microcontroller, and wherein the microcontroller monitors a speed of return of the damper to the closed position by measuring time intervals between state transitions measured by the sensor, and wherein the microcontroller short circuit the bridge circuit and thereby slows the electric motor and return of the damper to the closed position if the microcontroller determines that the speed barn exceeded a given threshold.

7. The spring return actuator of claim 6, further comprising a potentiometer to indicate when the damper approaches the closed position.

8. The spring return actuator of claim 6, wherein the microcontroller slows the electric motor when the damper nears the closed position.

9. A heating, ventilating, and air-conditioning system, comprising:
   an electric motor powered by a power source;
   a damper coupled to the electric motor, the damper moving between an open position and a closed position;
   a spring biasing the damper to the closed position; and
   a microcontroller coupled to the electric motor, wherein, upon failure of the power source with the damper in the open position, the spring returns the damper to the closed position, thereby spinning the electric motor to generate electricity to power the microcontroller, and wherein the microcontroller monitors a speed of return of the damper to the closed position and slows the electric motor and return of the damper to the closed position if the microcontroller determines that the speed has exceeded a given threshold.

10. The actuator of claim 9, further comprising a potentiometer to indicate when the load approaches the first position.

11. A method of returning a damper to a closed position, the damper being coupled to an electric motor, and a spring coupled to the electric motor to return the damper to the closed position, the method comprising:
   allowing the spring to return the damper to the closed position upon power failure;
   measuring a speed of return of the damper to the closed position by monitoring state transitions of sensors of the electric motor,
   slowing the speed of return of the electric motor if the speed has exceeded a given threshold.

12. The method of claim 11, further comprising powering a microcontroller using electricity generated by the electric motor being turned by the spring, the microcontroller slowing the speed of return if the speed has exceeded the given threshold.

13. The method of claim 11, wherein the slowing step further comprising short-circuiting the electric motor to slow the speed of return.

14. The method of claim 11, further comprising slowing the speed of return of the electric motor as the damper nears the closed position.

15. An actuator, comprising:
   a motor driven by a circuit powered by a power source;
   a load coupled to the motor;
   a member biasing the load to a first position; and
   a controller coupled to the motor to commutate the motor;
   wherein the member biases the load into the first position, and wherein, as the member moves the load into the first position, the motor is spun to generate electricity that powers the controller.

16. The actuator of claim 15, wherein the member is a spring.

17. The actuator of claim 15, wherein the load is a damper.

18. The actuator of claim 15, wherein the controller governs a speed at which the member moves the load to the first position.

19. The actuator of claim 15, further comprising a potentiometer to indicate when the load approaches the first position.

20. The actuator of claim 15, wherein the member moves the load to the first position upon failure of the power source.

21. A method of returning a damper to a first position, the damper being coupled to an electric motor of an actuator, the electric motor being adapted to drive the damper from the first position to a second position under control of a controller, the method comprising:
   mechanically driving the damper from the second position toward the first position, wherein the motor is spun as the damper is driven toward the first position;
   using electricity generated by the motor as the motor is spun to power the controller; and
   using the controller to slow a speed at which the damper is mechanically driven toward the first position.

22. The method of claim 21, further comprising allowing the controller to slow the speed at which the damper is mechanically driven toward the first position if the speed exceeds a given threshold.

23. The method of claim 21, further comprising slowing the speed at which the damper is mechanically driven toward the first position when the damper reaches a predetermined position.

24. The method of claim 21, wherein the damper is mechanically driven toward the first position by a spring.

* * * * *